United States Patent
Kaneda et al.

(10) Patent No.: US 7,937,214 B2
(45) Date of Patent: May 3, 2011

(54) GUIDANCE ROUTE SEARCH DEVICE, NAVIGATION DEVICE, AND METHOD OF SEARCHING GUIDANCE ROUTE

(75) Inventors: Masaki Kaneda, Machida (JP); Masahiro Ueno, Tokyo (JP); Hiromi Akiyoshi, Machida (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 181 days.

(21) Appl. No.: 10/589,615

(22) PCT Filed: Feb. 4, 2005

(86) PCT No.: PCT/JP2005/002096
§ 371 (c)(1),
(2), (4) Date: Jun. 4, 2007

(87) PCT Pub. No.: WO2005/078393
PCT Pub. Date: Aug. 25, 2005

(65) Prior Publication Data
US 2007/0288155 A1    Dec. 13, 2007

(30) Foreign Application Priority Data
Feb. 17, 2004   (JP) ................................. 2004-039335

(51) Int. Cl.
*G01C 21/00* (2006.01)
(52) U.S. Cl. ........... 701/200; 705/5; 705/6; 340/995.19; 340/988; 340/989; 340/990
(58) Field of Classification Search .................. 701/209, 701/200; 705/5, 6, 7, 8, 9; 340/995.19, 988, 340/989, 990
See application file for complete search history.

(56) References Cited

U.S. PATENT DOCUMENTS

| 5,924,075 | A | | 7/1999 | Kanemitsu |
| 5,940,803 | A | * | 8/1999 | Kanemitsu ........................ 705/6 |
| 5,948,040 | A | * | 9/1999 | DeLorme et al. ............. 701/201 |
| 6,119,095 | A | * | 9/2000 | Morita .............................. 705/5 |
| 6,510,384 | B2 | * | 1/2003 | Okano .......................... 701/209 |

(Continued)

FOREIGN PATENT DOCUMENTS
EP        0 785 519      7/1997
(Continued)

OTHER PUBLICATIONS

Official Action (Application No. 2004-039335) Dated Jun. 30, 2008.

(Continued)

*Primary Examiner* — Mark Hellner
*Assistant Examiner* — Redhwan Mawari
(74) *Attorney, Agent, or Firm* — Eric J. Robinson; Robinson Intellectual Property Law Office, P.C.

(57) ABSTRACT

A guidance route search device essentially having means for specifying a route point and means for selecting a guidance schedule. The route specifying means specifies plural route points guided up to a destination point. The selecting means functions to select a guidance schedule covering plural route points reachable by previously set time of arrival at a destination point and causing staying time at the plural route points to be the maximum within maximum staying time set in advance for the route points. This enables a guidance schedule for guiding through plural route points to be generated with consideration of staying time at each route point.

8 Claims, 14 Drawing Sheets

U.S. PATENT DOCUMENTS

| | | | |
|---|---|---|---|
| 6,816,778 B2 * | 11/2004 | Diaz | 701/200 |
| 2002/0004700 A1 * | 1/2002 | Klein | 701/200 |
| 2002/0047700 A1 * | 4/2002 | Tabota | 324/76.49 |
| 2002/0082771 A1 * | 6/2002 | Anderson | 701/209 |
| 2005/0216301 A1 * | 9/2005 | Brown | 705/1 |
| 2006/0058948 A1 * | 3/2006 | Blass et al. | 701/207 |
| 2007/0288155 A1 * | 12/2007 | Kaneda | 701/200 |
| 2008/0033633 A1 * | 2/2008 | Akiyoshi et al. | 701/201 |

FOREIGN PATENT DOCUMENTS

| | | |
|---|---|---|
| EP | 0 786 732 | 7/1997 |
| EP | 1 152 220 | 11/2001 |
| JP | 09-198439 | 7/1997 |
| JP | 09-204475 | 8/1997 |
| JP | 09-212563 | 8/1997 |
| JP | 11-094578 | 4/1999 |
| JP | 2001-221647 | 8/2001 |
| JP | 2002-149763 | 5/2002 |
| JP | 2003-121182 | 4/2003 |

OTHER PUBLICATIONS

Official Action (Application No. 2004-039335) Dated Aug. 4, 2009.
International Preliminary Report dated Sep. 28, 2006 for Application No. PCT/JP2005/002096.
Official Action (Application No. 2004-039335) dated Mar. 2, 2010.
Supplementary Partial European Search Report (Application No. 05710148.7-1236/1717557) dated Dec. 20, 2010.

* cited by examiner

FIG. 3

| | NAME | CATEGORY | HOLIDAY | BUSINESS HOURS | POINT |
|---|---|---|---|---|---|
| A | ○△ HOTEL | HOTEL | NONE | 11:00 – 14:00, 18:00 – 24:00 | 1234 |
| B | RESTAURANT ○ ▨ | RESTAURANT | MONDAY | 10:00 – 20:00 | 4567 |
| C | ○○ DEPARTMENT STORE | DEPARTMENT STORE | WEDNESDAY | 8:00 – 22:00 | 1224 |
| D | □○ CAFE | CAFE | NONE | 10:00 – 18:00 | 1356 |
| E | □ ANCIENT TOMB | FAMOUS PLACE | MONDAY | 18:00 – 21:00 | 1148 |
| F | RISTORANTE △ | RESTAURANT | THURSDAY | | 0573 |
| ... | | | | | |

| CATEGORY NAME | GUIDANCE TIME | POSSIBLE STAYING TIME |
|---|---|---|
| RESTAURANT | 13:00 | 2 HOURS |
| CAFE | 15:00 | 2 HOURS |
| DEPARTMENT STORE | | 4 HOURS |
| FAMOUS PLACE | | 3 HOURS |
| ⋮ | | |

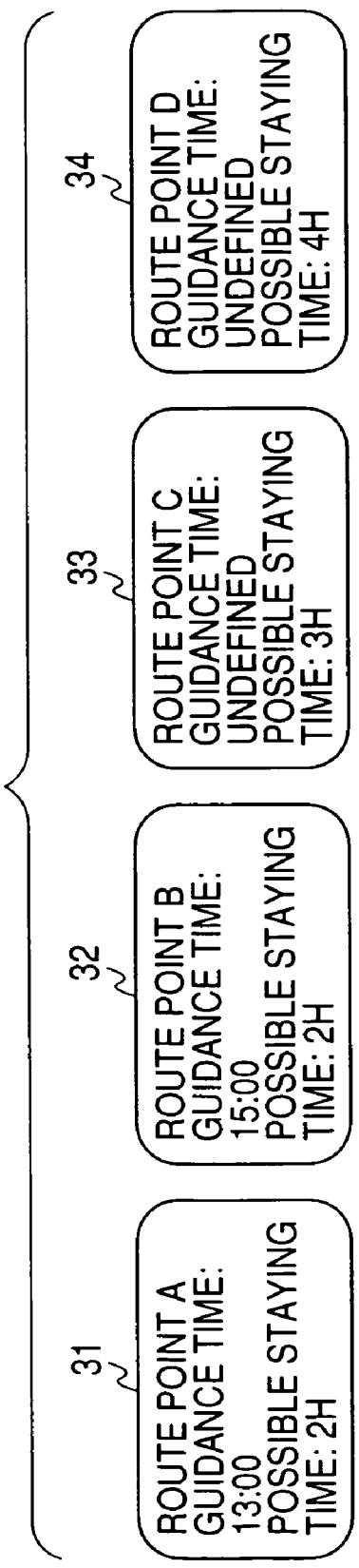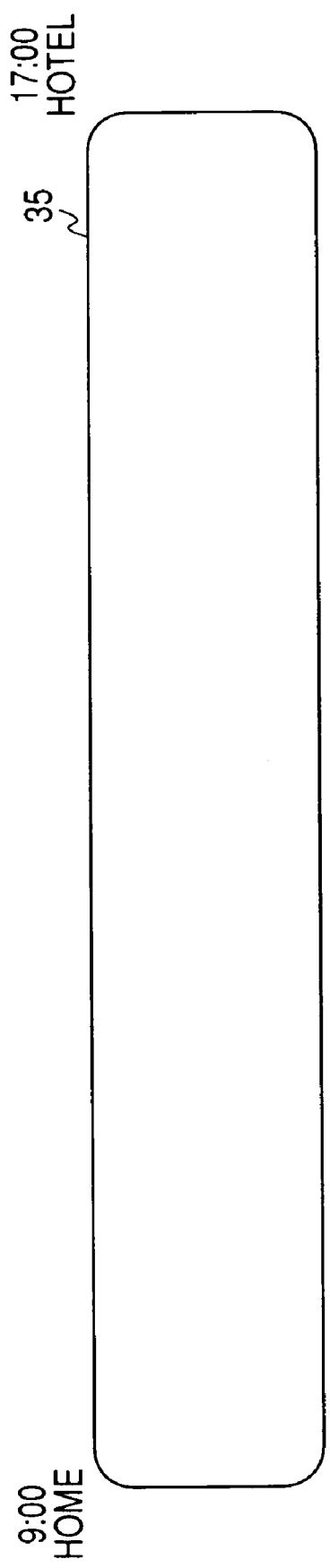

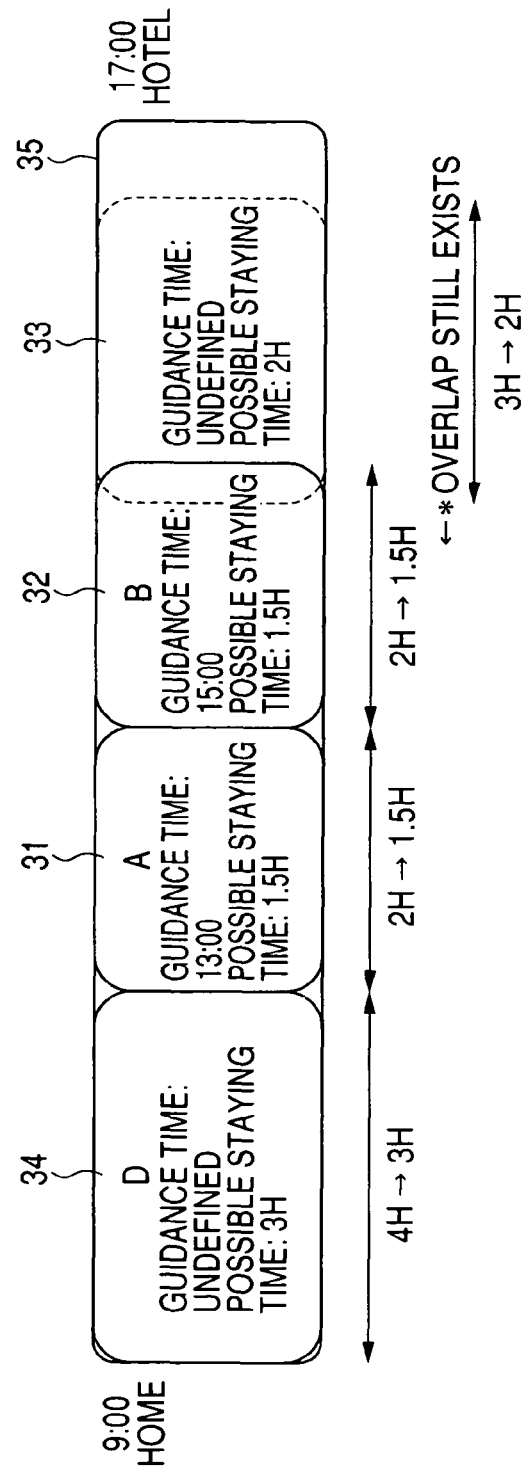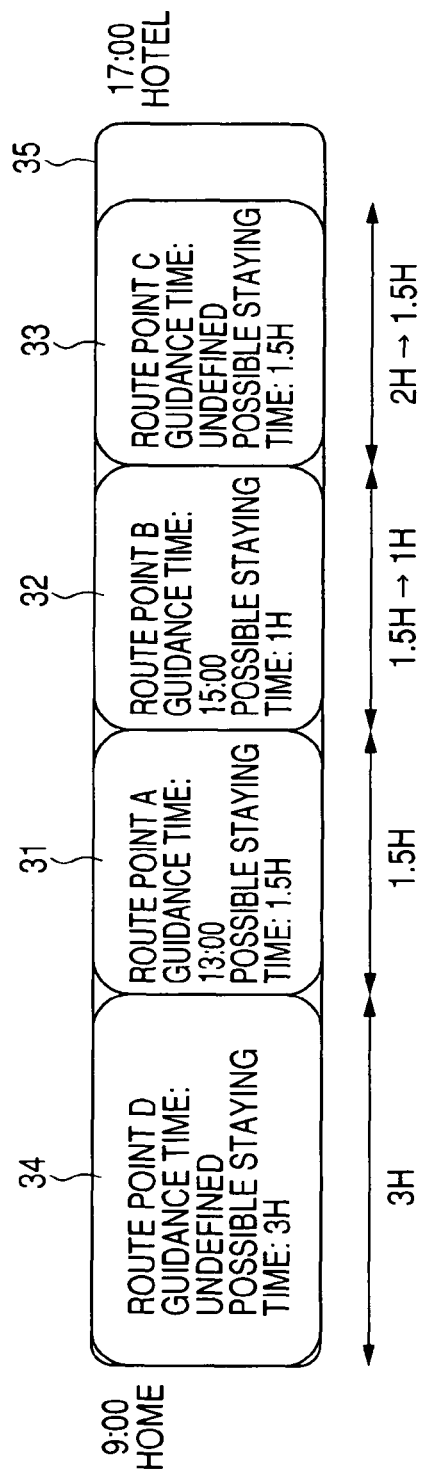

GUIDANCE ROUTE SEARCH DEVICE, NAVIGATION DEVICE, AND METHOD OF SEARCHING GUIDANCE ROUTE

TECHNICAL FIELD

The present invention relates to a guidance route search device, a navigation device and a method of searching for guidance route.

BACKGROUND ART

Japanese Patent Application Laid-Open No. 2001-221647 (Patent Document 1) discloses a method of searching for guidance route, for searching a guidance route in which multiple route points are passed through (for example, in the CLAIMS thereof and the paragraphs [0033] to [0052] in the specification). In the conventional method of searching for route disclosed in Patent Document 1, the order of passing through the multiple route points is determined based on a search condition set to search for a route and the dependence relation between particular route points, and a route for passing through the multiple route points in that order to reach a destination point is searched for. In this Patent Document 1, an example is disclosed in which the search condition set to search for a route is selected from among time (shorter required time), distance (shorter travel distance) and fare (lower tall fare).

However, with a guidance route retrieved by the conventional method of searching for route disclosed in Patent Document 1, it is difficult to create a plan which considers staying time spent at each route point.

Therefore, when a user creates a guidance route which passes through a lot of route points with the use of the conventional method of searching for route disclosed in Patent Document 1 and is guided by the guidance route, he or she has to care about staying time at each route point. Therefore, the user leaves each route point earlier, feeling pressed by time. As a result of leaving each route point earlier, the user may reach a destination point such as a hotel earlier than a scheduled arrival time.

In addition, for example, if a user sets fewer route points to allow sufficient time therefor with the use of the conventional method of searching for route disclosed in Patent Document 1 and is guided by the guidance route, it is not necessary for the user to start from each route point earlier. However, since the user does not know suitable departure time at each route point, he or she may stay at each route point too long and arrive at a destination point such as a hotel later than scheduled in spite of having set fewer route points.

The object of the present invention is to obtain a guidance route search device for generating a guidance schedule for dropping into multiple route points in consideration of the staying time at each route point and a method of searching for guidance route, and obtain a navigation device for performing route guidance under the guidance schedule generated in consideration of the staying time at the multiple route points.

DISCLOSURE OF THE INVENTION

In order to achieve the above object of the invention, a guidance route search device according to a first viewpoint of the present invention is provided with: route point specifying means for specifying multiple route points to which a user is to be guided before reaching a destination point; and selecting means for selecting a guidance schedule in which the multiple route points are passed through by preset time of arrival at the destination point and in which the staying time at multiple route points is the longest, the staying time at the route points being within the maximum staying time preset for the route points.

A guidance route search device according to a second viewpoint is provided with: route point specifying means for specifying multiple route points to which a user is to be guided before reaching a destination point; temporary determination means for determining staying time periods at multiple route points based on staying time prespecified for each route point; determination means for making determination about a guidance schedule in which the multiple route points are passed through, based on the staying time periods at the multiple route points and traveling time among the route points; and adjustment means for adjusting the staying time at least at one route point in response to the result of determination by the determination means.

In the guidance route search device according to the second viewpoint, the determination means operates to determine whether the guidance schedule in which the multiple route points are passed through is possible or not; and if it is determined by the determination means that the guidance schedule in which the multiple route points are passed through is not possible, the adjustment means operates to reduce the staying time at least at one route point.

In the device according to the second viewpoint, the prespecified staying time is specified within the range of a trip time period from departure time of a trip for dropping into the multiple route points to time of arrival at a destination point.

Furthermore, in the device according to the second viewpoint, the prespecified staying time is specified within a range of a trip time period from departure time of a trip for dropping into the multiple route points to arrival time; the determination means operates to determine whether there is spare time other than the staying time at the route points and the traveling time among the route points within the range of the trip time period; and, if it is determined by the determination means that there is spare time, the adjustment means operates to add a part or all of the spare time to the staying time at least at one route point.

Furthermore, preferably, the device according to the second viewpoint is further provided with: display means for displaying the guidance schedule for the multiple route points adjusted by the adjustment means; input means to be operated in order to change the guidance schedule displayed on the display means; and change means for changing the guidance schedule in response to a change operation with the input means and causing the display means to display the changed guidance schedule.

Furthermore, preferably, in the device according to the second viewpoint, time to start staying and/or the staying time prespecified for each route point is specified based on at least one among the route point, type of the route point, user, user group, time of year for utilization and user age.

According to another viewpoint, the present invention can be grasped as a guidance route search method constituted by a sequence of signal processing steps to be performed in the guidance route search device described above.

In this case, according to a first aspect, the present invention provides a guidance route search method including: specifying multiple route points to which a user is to be guided before reaching a destination point; and selecting a guidance schedule in which the multiple route points are passed through by preset time of arrival at the destination point and in which the staying time at multiple route points is the longest, the staying time at the route points being within the maximum staying time preset for the route points.

Furthermore, according to a second aspect, the present invention provides a guidance route search method including: specifying multiple route points to which a user is to be guided before reaching a destination point; determining staying time periods at multiple route points based on staying time prespecified for each route point; making determination about a guidance schedule in which the multiple route points are passed through, based on the staying time periods at the multiple route points and traveling time among the route points; and adjusting the staying time at least at one route point in response to the result of determination by the step of performing determination.

Furthermore, according to another aspect, the present invention can be grasped as a computer program for causing a computer to execute a sequence of processings for causing the above-described guidance route search device to operate.

In this case, according to a first aspect of the present invention, there is provided a computer program for causing the following steps to be executed: a step of specifying multiple route points to which a user is to be guided before reaching a destination point; and a step of selecting a guidance schedule in which the multiple route points are passed through by preset time of arrival at the destination point and in which the staying time at multiple route points is the longest, the staying time at the route points being within the maximum staying time preset for the route points.

Furthermore, according to a second aspect, there is provided a computer program for causing the following steps to be executed: a step of specifying multiple route points to which a user is to be guided before reaching a destination point; a step of determining staying time periods at multiple route points based on staying time prespecified for each route point; a step of making determination about a guidance schedule in which the multiple route points are passed through, based on the staying time periods at the multiple route points and traveling time among the route points; and a step of adjusting the staying time at least at one route point in response to the result of determination by the step of performing determination.

Since the present invention adopts the configuration described above, the following remarkable effects and advantages are obtained: (i) it is possible to generate a guidance schedule for dropping into multiple route points in consideration of staying time at each route point; and (ii) it is possible to select a route in accordance with the guidance schedule generated in consideration of staying time at multiple route points.

BRIEF DESCRIPTION OF THE DRAWINGS

FIG. 3 is an illustration diagram showing an example of candidate route point search data in FIG. 2;

FIG. 4 is an illustration diagram showing an example of a table of conditions for route points according to categories in FIG. 2;

FIG. 7 is a diagram showing an example of combination of multiple route points in the embodiment 1 of the present invention;

FIG. 8 is a diagram showing a time axis based on departure/arrival conditions inputted by a user in the embodiment 1 of the present invention;

FIG. 11 is a diagram showing that staying time at all the route points is reduced after the state shown in FIG. 10;

FIG. 12 is a diagram showing that, for such route points that the staying time therefore is overlapping, the staying time is reduced after the state shown in FIG. 11;

BEST MODE FOR CARRYING OUT THE INVENTION

Embodiments of a guidance route search device, a navigation device and a method of searching for guidance route will be specifically described below in detail with reference to drawings. The navigation device will be described with a car navigation device to be mounted on a vehicle, such as an automobile, a two-wheeled motor vehicle and an aircraft, as an example. The guidance route search device will be described as a part of the configuration of this car navigation device. The method of searching for guidance route will be described as a part of the operation of this car navigation device.

EMBODIMENT 1

Figure 1:
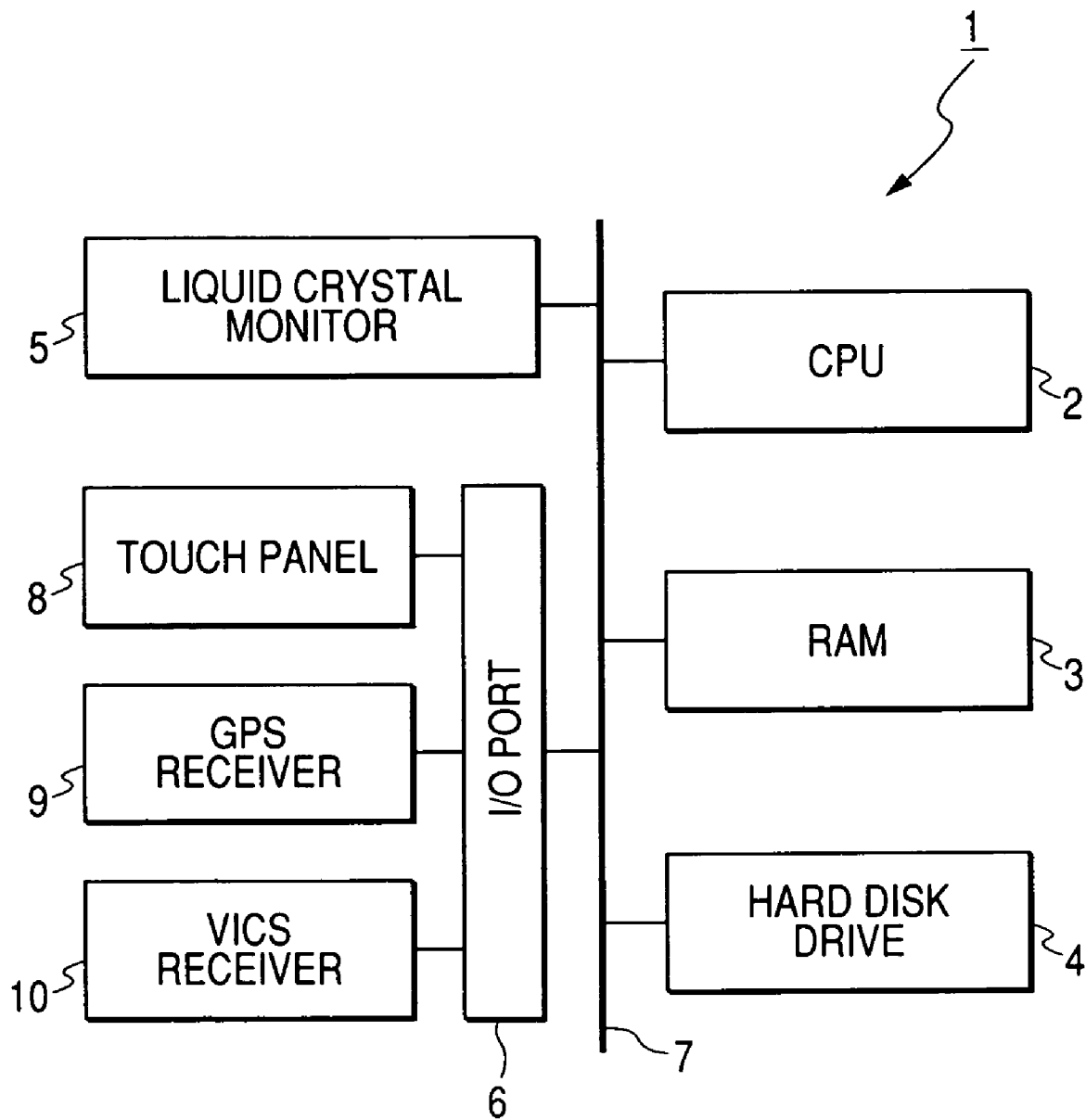
FIG. 1 is a block diagram showing the hardware configuration of a car navigation device according to an embodiment 1 of the present invention.

FIG. 1 is a block diagram showing the hardware configuration of a car navigation device 1 according to an embodiment 1 of the present invention.

The car navigation device 1 has a CPU (central processing unit) 2 which executes programs, a RAM (random access memory) 3 which stores a program being executed or data, a hard disk drive 4 which stores programs and the like, a liquid crystal monitor 5 which displays display data, an I/O (input/output) port 6 to which peripheral equipment is connected, and a system bus 7 which connects these.

To the I/O port 6, there are connected a touch panel 8 which is arranged being overlapped on the display screen of the liquid crystal monitor 5 and which outputs a signal indicating a pressed position, a GPS receiver 9 as a current position update means for receiving radio waves from a GPS (global position system) satellite and outputting the values of current latitude and longitude, and a VICS receiver 10 which receives FM waves, optical beacons or radio wave beacons and outputs VICS (vehicle information and communication system) information included therein. The VICS information includes traffic regulation information, congestion information and the like.

The liquid crystal monitor 5 may be connected to the system bus 7 via the I/O port 6. A car speed pulse generator which outputs a pulse corresponding to the speed of a vehicle or a gyro sensor which indicates the movement direction of a vehicle may be connected to the I/O port 6.

Figure 2:
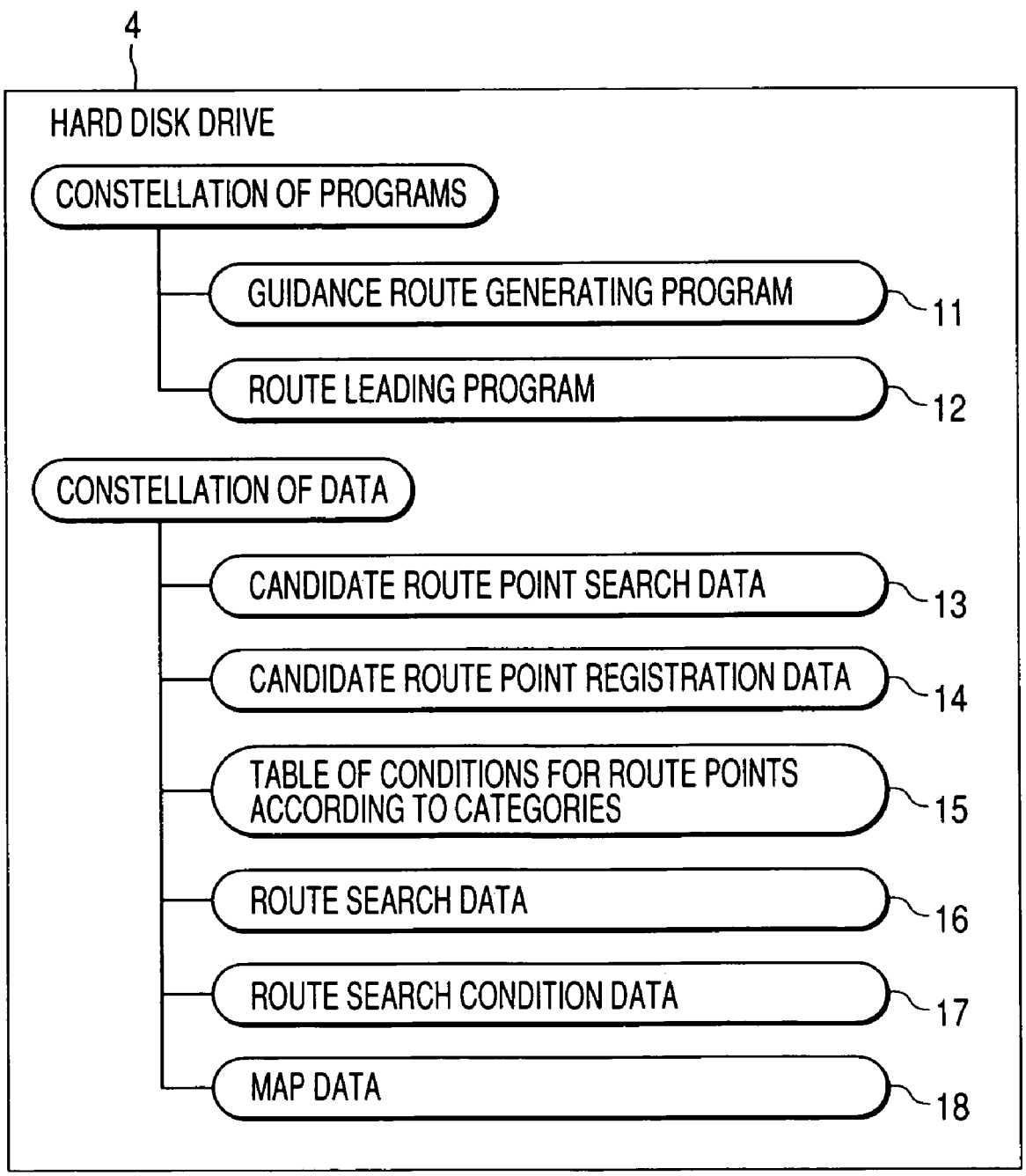
FIG. 2 is an illustration diagram of the content stored in a hard disk drive in FIG. 1.

FIG. 2 is an illustration diagram of the content stored in the hard disk drive 4 in FIG. 1.

In the hard disk drive 4, a constellation of programs and a constellation of data are stored. The constellation of programs in the hard disk drive 4 includes a guidance route generating program 11 and a route guiding program 12. The constellation of data in the hard disk drive 4 includes candidate route point search data 13, candidate route point registration data 14, a table of conditions for route points according to categories 15, route search data 16, route search condition data 17 and map data 18.

The candidate route point search data 13, the table of conditions for route points according to categories 15, the route search data 16, the map data 18 and the like may be recorded in a computer-readable recording medium which can be inserted into and removed from the car navigation device 1 so that the car navigation device 1 reads the data from this recording medium. The constellation of programs and the constellation of data may be recorded in separate recording media.

The candidate route point search data 13 has a record for each candidate route point. The candidate route points of the candidate route point search data 13 are registered in advance, for example, before shipment of the car navigation device 1. For example, restaurants, amusement facilities and the like are included therein.

FIG. 3 is an illustration diagram showing an example of the candidate route point search data 13 in FIG. 2. In FIG. 3, information registered in each record is shown on each line. The record for each candidate route point includes attribute information about the candidate route point, such as the name, category, holiday and business hours of the candidate route point, a value indicating the position of the candidate route point, and the like. For example, "department store" is associated with a selling facility with a name of ""; department store" as a category; "Wednesday" is associated therewith as a holiday; "10:00 to 20:00" is associated therewith as business hours; and "1224" is associated therewith as a value indicating the position.

Though the value indicating the position of a candidate route point to be registered with the candidate route point search data 13 may be a value based on the latitude/longitude of the candidate route point, it may be another value associated with the value based on the latitude/longitude, for example, a value of a map code (registered trademark). Though the value may be a value based on the latitude/longitude of the candidate route point itself, it may be a value based on the latitude/longitude of a position related to the candidate route point, for example, a parking area in tie-up with the candidate route point.

The candidate route point registration data 14 has multiple records for respective candidate route points registered by a user. The record for each candidate route point includes attribute information about the registered candidate route point, such as the name, category, holiday and business hours of the candidate route point, a value indicating the position of the registered candidate route point, and the like.

The table of conditions for route points according to categories 15 has multiple records for each category. Category is one piece of information among the attribute information about each candidate route point. As the categories, there are, for example, a restaurant, a famous place, a hotel and the like.

FIG. 4 is an illustration diagram showing an example of the table of conditions for route points according to categories 15 in FIG. 2. In FIG. 4, information registered for each record is shown on each line. The record for each category includes attribute information about the category, such as the name of the category, guidance time and possible staying time. For example, with the category "restaurant", "13:00" is associated as the guidance time, and "2 hours" is associated as the possible staying time. The guidance time and the possible staying time for each category are staying conditions for each route point in this embodiment 1.

The route search data 16 has multiple pieces of node information and multiple pieces of link information. The node information is information about a position such as an intersection, and it is configured by identification information about the position, a value indicating the position, a list of identification numbers of links connected to the node, and the like. The link information is information about a route, such as a road connecting nodes, and it is configured by identification information about the route, a list of identification numbers of connected nodes, and the like.

The route search condition data 17 is data showing search conditions used in searching for a recommended route, and it is data indicating a selection criterion to select one of multiple routes, such as the shortest distance, the shortest traveling time, general road priority and toll road priority. The selection criterion is not limited to one reference item. A combination of multiple reference items may be possible.

The map data 18 is a map of a predetermined region, such as all Japan, Kanto region and Tokyo, which has been converted into image data constituted by multiple dots. Each dot has brightness information. As the map, there are a road map, a house map and the like. The map data 18 has values indicating the positions of the respective dots thereof.

Next, description will be made on the operation of the car navigation device 1 according to the embodiment 1 having the configuration as described above.

When the car navigation device 1 is activated, the central processing unit 2 reads a program stored in the hard disk drive 4 into the RAM 3 and executes it.

Figure 5:
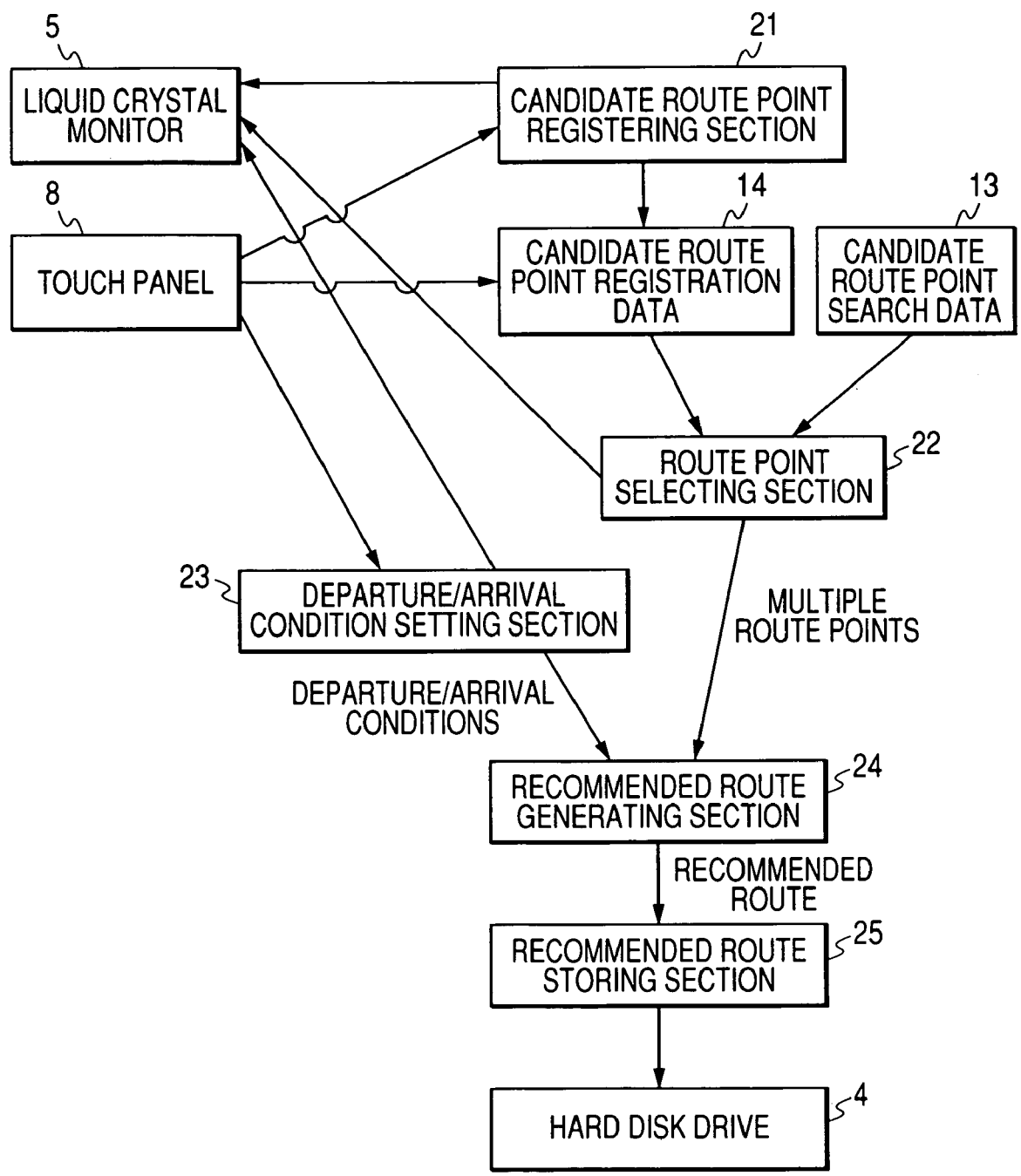
FIG. 5 is a block diagram showing functional blocks for guidance route generation realized in the car navigation device in FIG. 1.

When the central processing unit 2 executes the guidance route generating program 11, various functional blocks for generating a guidance route are realized in the car navigation device 1. FIG. 5 is a block diagram showing the functional blocks for guidance route generation realized in the car navigation device 1 in FIG. 1. By the central processing unit 2 executing the guidance route generating program 11, there are realized a candidate route point registering section 21, a route point selecting section 22, a departure/arrival condition setting section 23, a recommended route generating section 24 and a recommended route storing section 25 in the car navigation device 1.

The candidate route point registering section 21 outputs display data for registering, modifying or deleting a candidate route point to the liquid crystal monitor 5. Thereby, a screen for registering, modifying or deleting a candidate route point is displayed on the liquid crystal monitor 5. Then, based on information generated by the touch panel 8 in response to a user operation, the candidate route point registering section 21 registers a new candidate route point with the candidate route point registration data 14, changes information about a candidate route point registered with the candidate route point registration data 14, or deletes a registered candidate route point from the candidate route point registration data 14.

Specifically, for example, attribute information about a candidate route point to be registered, such as the name, category, holiday and business hours, or an image showing the position of the candidate route point is displayed on the liquid crystal monitor 5. Based on operation position information on the image, which is outputted from the touch panel 8 in response to a user operation, the candidate route point registering section 21 identifies attribute information and the like about the candidate route point, adds a new record to the candidate route point registration data 14 and stores the information in the added record. The value indicating the position of the candidate route point to be registered with the candidate route point registration data 14 may be directly inputted by the user. In addition, for example, it is also possible to scrollably display the map data 18 on the liquid crystal monitor 5, identify the point selected by the user based on operation information outputted from the touch panel 8, and substitute a value indicating the identified point.

The route point selecting section 22 functions as the route point specifying means and outputs display data for selecting a candidate route point from among candidate route points registered with the candidate route point search data 13 in advance and candidate route points registered with the candidate route point registration data 14 by the user, to the liquid crystal monitor 5. Thereby, an image for selecting a candidate route point is displayed on the liquid crystal monitor 5.

Then, the user operates the touch panel 8 in accordance with the screen of the liquid crystal monitor 5 to display a desired candidate route point on the liquid crystal monitor 5 and selects the desired candidate route point. When the candidate route point is selected by the user, the route point selecting section 22 causes the candidate route point to be stored in the RAM 3 or the hard disk drive 4 as a route point.

It is possible to select multiple candidate route points. If multiple candidate route points are selected, the selected multiple candidate route points are stored in the RAM 3 or the hard disk drive 4 as multiple route points.

When selection of a route point by the route point selecting section 22 is completed, the departure/arrival condition setting section 23 outputs display data for inputting a departure point, departure time, a destination point and arrival time to the liquid crystal monitor 5. Thereby, an image screen for inputting these is displayed on the liquid crystal monitor 5. Then, the user operates the touch panel 8 in accordance with the screen of the liquid crystal monitor 5 to input a departure point, departure time, a destination point and arrival time.

The departure point, the departure time, the destination point and the arrival time are the departure/arrival conditions according to this embodiment 1. The time between the departure time to leave the departure point and the arrival time to reach the destination time is a trip time period from the departure time of a trip for dropping into multiple route points to the arrival time.

The value indicating a departure point and the value indicating a destination point may be directly inputted by the user. In addition, for example, it is also possible to scrollably display the map data 18 on the liquid crystal monitor 5, identify the point selected by the user based on operation information outputted from the touch panel 8, and substitute a value indicating the identified point.

When the departure/arrival conditions are specified in this way, the departure/arrival condition setting section 23 causes the departure point, the departure time, the destination point and the arrival time to be stored in the RAM 3 or the hard disk drive 4 as departure/arrival conditions.

Figure 6:
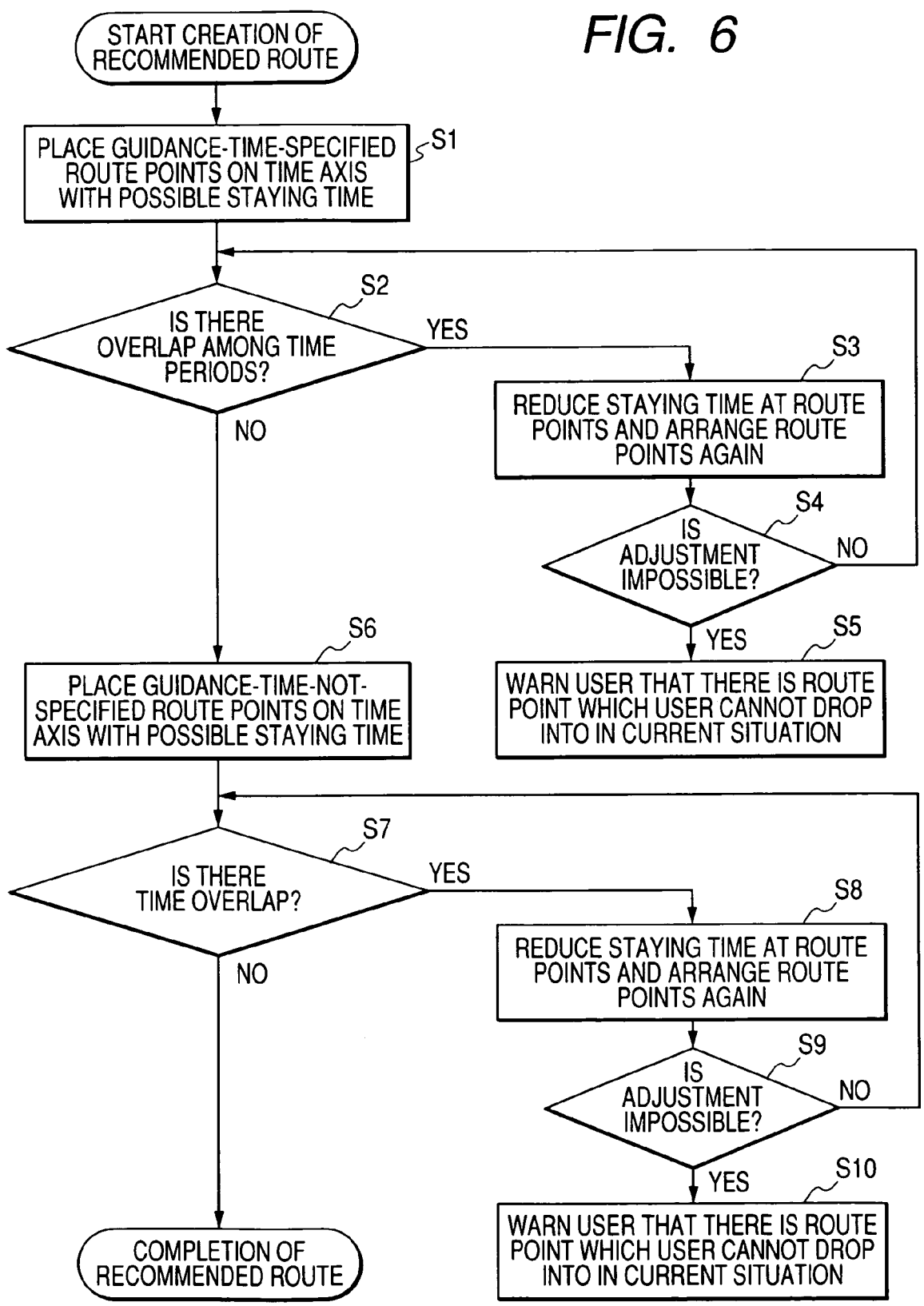
FIG. 6 is a flowchart showing the flow of search processing executed by a recommended route generating section in FIG. 5.

When input of the departure/arrival conditions by the departure/arrival condition setting section 23 is completed, the recommended route generating section 24 starts processing for searching for a recommended route from the departure point inputted by the user to the destination point inputted by the user via the route points selected by the user. FIG. 6 is a flowchart showing the flow of search processing executed by the recommended route generating section 24 in FIG. 5.

The recommended route generating section 24 first functions as the temporary determination means, and it extracts route points for which guidance time is specified (hereinafter described as guidance-time-specified route points) from among the route points selected by the user, and places the staying time periods at the guidance-time-specified route points, on the trip time period from the departure time to leave the departure point to the arrival time to arrive at the destination point, on a time axis. In this case, the staying time at each of the guidance-time-specified route points is assumed to be possible staying time. Thereby, the staying time periods at guidance-time-specified route points are temporarily determined (step S1). The staying time period means a period from the time when staying starts to the time when staying ends.

Next, the recommended route generating section 24 functions as the determination means and determines whether or not the staying time periods at the multiple guidance-time-specified route points overlap with one another (step S2).

If the staying time periods at the multiple guidance-time-specified route points overlap one another, then the recommended route generating section 24 functions as the adjustment means and reduces the staying time periods at the guidance-time-specified route points by a predetermined rate or by a predetermined time (step S3).

Subsequently, the recommended route generating section 24 determines whether or not the overlap among the staying time periods is eliminated. The determination whether or not the overlap among the staying time periods is eliminated may be performed based on whether the number of times of performing the reduction processing has exceeded a predetermined number of times or not or based on whether sufficient staying time is not secured or not (step S4).

If it is determined at step S4 that the overlap among staying time periods is not eliminated, then the recommended route generating section 24 gives a warning to the user that there is a guidance-time-specified route point which the user cannot drop into in the current situation. For example, this warning may be displayed on the liquid crystal monitor 5 (step S5).

If it is determined at step S2 that the multiple staying time periods at the multiple guidance-time-specified route points do not overlap with one another, then the recommended route generating section 24 functions as the temporary determination means and places the staying time periods at the remaining route points, that is, route points for which guidance time is not specified (hereinafter described as guidance-time-not-specified route point) on the trip time period. In this case, the staying time at each guidance-time-not-specified route point is assumed to be possible staying time. Thereby, the staying time periods at all the route points including the guidance-time-not-specified route points are temporarily determined.

The recommended route generating section 24 places traveling time among route points (that is, a time period of movement) on the trip time period. The traveling time among route points may be any of fixed traveling time, traveling time simply corresponding distance among route points, and traveling time on an actual guidance route retrieved based on the route search data 16 and the route search condition data 17 (step S6).

Then, the recommended route generating section 24 functions as the determination means and determines whether or not staying time periods at the multiple route points overlap with one another (step S7).

If the staying time periods at the multiple route points overlap with one another, then the recommended route generating section 24 functions as the adjustment means, and it reduces the staying time at all the route points by a predetermined rate a predetermined time, or reduces only the staying time at the overlapping route points by a predetermined rate or by a predetermined time (step S8).

The recommended route generating section 24 may determine whether or not it is possible to drop into the multiple route points instead of whether or not the staying time periods at the multiple route points overlap with one another at step S7 and proceed to step S8 if it is determined that it is impossible to drop into the multiple route points.

After that, the recommended route generating section 24 determines whether or not the overlap among the staying time periods is eliminated. The determination whether or not the overlap among the staying time periods may be performed, for example, based on whether the number of times of performing the reduction processing has exceeded a predetermined number of times or not or based on whether sufficient staying time is not secured or not (step S9).

Then, if it is determined at step S9 that the overlap among the staying time periods is not eliminated, then the recommended route generating section 24 gives a warning to the user that there is a route point which the user cannot drop into. For example, this warning may be displayed on the liquid crystal monitor 5 (step S10).

If it is determined at step S7 that the staying time periods at the route points do not overlap at all, then the recommended route generating section 24 regards the route as a recommended route and generates a guidance schedule including the recommended route and the staying time period at each route point. The recommended route storing section 25 causes this guidance schedule including the recommended route to be stored in the RAM 3 or the hard disk drive 4 together with an actual guidance route among the route points based on the recommended route.

In this way, the recommended route generating section 24 functions as the selecting means which selects a guidance schedule in which multiple route points are passed through by preset time of arrival at a destination point and in which the staying time at multiple route points is the longest, the staying time at the route points being within the maximum staying time preset for the route points.

If the processing for searching for an actual guidance route among route points has not been completed in the recommended route generation processing, then the recommended route storing section 25 searches for an actual guidance route among route points based on the route search data 16 and the route search condition data 17. Traffic information received by the VICS receiver 10 may be used together with the route search data 16 and the route search condition data 17.

When multiple route points including at least one guidance-time-not-specified route point are specified by the user, multiple passing patterns in which order of passing through the multiple route points differs are conceivable. In such a case, the recommended route generating section 24 can generate guidance schedules for the passing patterns for all the types of passing order at step S6 to select one of the guidance schedules in which the overlapping time among staying times of the multiple route points is the shortest, select one in which the total traveling time among the route points or the total trip distance between the departure time and the arrival time is the shortest, or cause the user to select one, at step S7.

As another processing to be performed in the case where multiple passing patterns are conceivable, it is also possible, for example, that the recommended route generating section 24 generates a guidance schedule for a passing pattern with any one type of passing order at step S6, and if it is determined that the staying time periods at the multiple route points still overlap with one another at step S9 after repeating the processing at steps S7 to S9 a predetermined number of times, then the recommended route generation section 24 generates a temporary guidance schedule for a passing pattern with another type of passing order and repeats the processing at step S7 to S9 for that other temporary guidance schedule. In this processing, if determining that staying time periods at the multiple route points still overlap with one another in the temporary guidance schedules for all the combinations of the route points, the recommended route generating section 24 can give the warning of step S10. When a passing pattern with one type of passing order is selected at step S6, the selection can be made so that a passing pattern with a shorter total traveling time required for or total trip distance of moving to a destination point via multiple route points after leaving a departure point is selected earlier.

FIGS. 7 to 12 are diagrams for illustrating an example of the recommended route search processing by the recommended route generating section 24 described above.

FIG. 7 is a diagram showing an example of combination of multiple route points in the embodiment 1 of the present invention. FIG. 7 shows four route points selected by a user, a route point A31, a route point B32, a route point C33 and a route point D34. The guidance time for the route point A31 is 13:00, and the possible staying time at the route point A31 is 2 hours. The guidance time for the route point B32 is 15:00, and the possible staying time at the route point B32 is 2 hours. The guidance time for the route point C33 is not defined in the table of conditions for route points according to categories 15, and the possible staying time at the route point C33 is 3 hours. The guidance time for the route point D34 is not defined in the table of conditions for route points according to categories 15, and the possible staying time at the route point D34 is 4 hours. Thus, the route point A31 and the route point B32 are guidance-time-specified route points. The route point C33 and the route point D34 are guidance-time-not-specified route points.

FIG. 8 is a diagram showing a trip time period 35 based on the departure/arrival conditions inputted by a user in the embodiment 1 of the present invention. The departure point is the user's home, and the departure time is 9:00. The destination point is a hotel, and the arrival time is 17:00.

Figure 9:
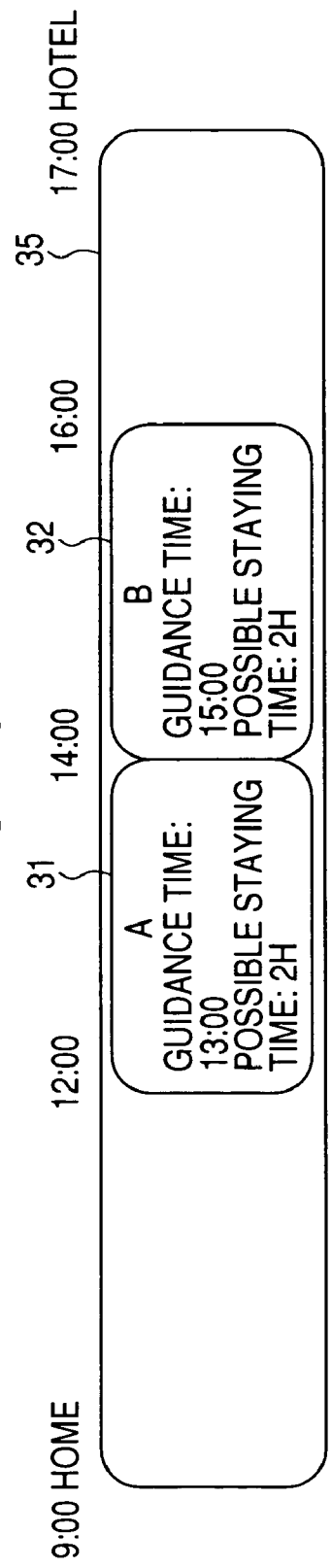
FIG. 9 is a diagram showing that route points A and B, for which guidance time is specified, among the multiple route points shown in FIG. 7 are placed on the time axis based on the departure/arrival conditions.

When such four route points A, B, C and D and the departure/arrival conditions are inputted by the user, the recommended route generating section 24 places the route points A31 and B32, which are guidance-time-specified route points, on the trip time period 35 from 9:00 to 17:00 (step S1 in FIG. 6). FIG. 9 is a diagram showing that the staying time periods at the route point A31 and the route point B32, for which guidance time is specified, among the multiple route points shown in FIG. 7 are placed on the trip time period 35 based on the departure/arrival conditions. In this case, since the user stays at the route point A31 from 12:00 to 14:00 and at the route point B32 from 14:00 to 16:00, the recommended route generating section 24 determines that the staying time periods at the two guidance-time-specified route points do not overlap with each other (step S2 in FIG. 6).

Since it is determined at step S2 that the staying time periods at the two guidance-time-specified route points do not overlap with each other, the recommended route generating section 24 places the staying time periods at the remaining two route points, that is, the route point C33 and the route point D34 on the trip time period 35 (step S6 in FIG. 6).

Figure 10:
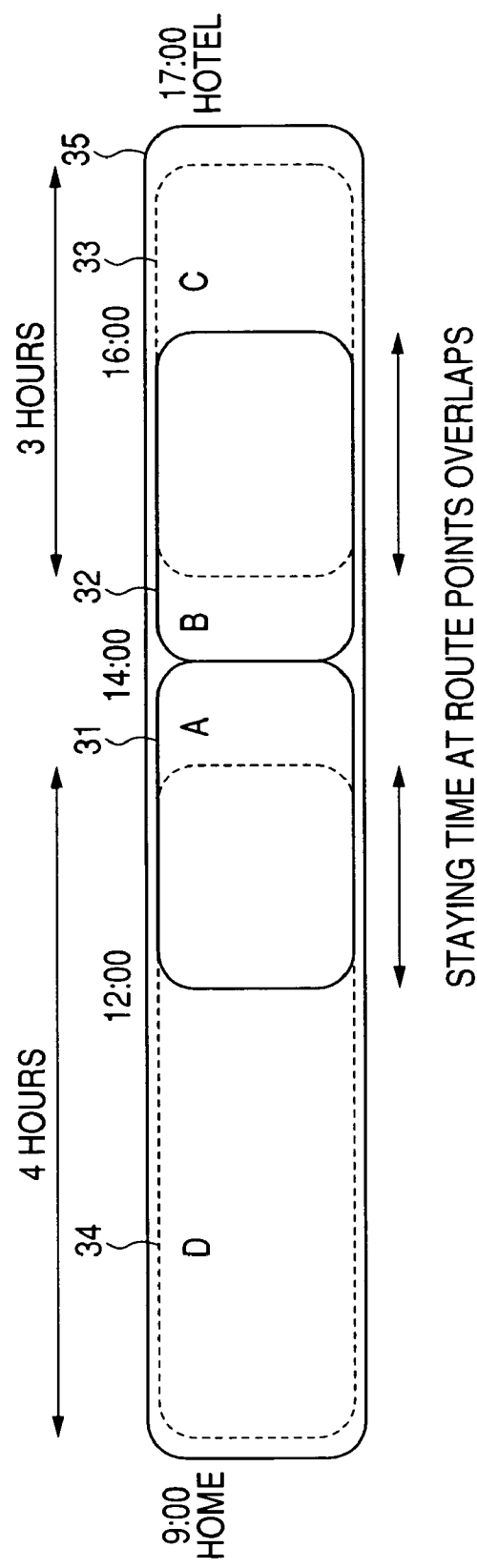
FIG. 10 is a diagram showing that all the route points shown in FIG. 7 are placed on the time axis based on the departure/arrival conditions.

FIG. 10 is a diagram showing that all the route points 31, 32, 33 and 34 shown in FIG. 7 are placed on the trip time period 35 based on the departure/arrival conditions. In FIG. 10, traveling time among route points is not considered. In FIG. 10, the staying time period at the route point D34 and the staying time period at the route point A31 overlap with each other. Furthermore, the staying time period at the route point B32 and the staying time period at the route point C33 overlap with each other.

In the case of the state of FIG. 10, since it is determined at step S7 in FIG. 6 that the staying time periods at the multiple route points overlap with one another, the recommended route generating section 24 first performs processing for reducing the staying time periods at all the route points 31, 32, 33 and 34 by a predetermined rate (step S8 in FIG. 6).

FIG. 11 is a diagram showing that the staying time at all the route points 31, 32, 33 and 34 is reduced after the state shown in FIG. 10. In FIG. 11, the staying time at the four route points 31, 32, 33 and 34 are reduced to three-fourths. However, the reduced staying time is a value obtained by rounding down less than 0.5 hours (an integral multiple of 0.5 hours). In FIG. 11, the staying time period at the route point D34 and the staying time period at the route point A31 do not overlap with each other any more by this processing. However, the staying time period at the route point B32 and the staying time period at the route point C33 still overlap with each other.

After that, the recommended route generating section 24 determines whether or not the staying time periods at the multiple route points overlap with one another again at step S7 in FIG. 6. Then, since the staying time period at the route point B32 and the staying time period at the route point C33 still overlap with each other, the recommended route generating section 24 performs the processing for reducing the staying time at the route points again (step S8 in FIG. 6).

In this case, since the staying time period at the route point D34 and the staying time period at the route point A31 do not overlap with each other any more by the previous staying time subtraction processing, the recommended route generating section 24 reduces only the staying time at the route point B32 and the staying time at the route point C33.

FIG. 12 is a diagram showing that the staying time at the route point B32 and the route point C33 has been reduced after the state shown in FIG. 11. In FIG. 12, the staying time at the route point B32 and the staying time at the route point C33 have been reduced. In FIG. 12, the staying time period at the route point B32 and the staying time period at the route point C33 do not overlap with each other any more by this processing.

Then, since the route points 31, 32, 33 and 34 do not overlap at all, the recommended route generating section 24 again repeats the determination at steps S9 and S7 and sets the generated route as a recommended route.

Though a traveling time period between two points among a departure point, route points and a destination point is not taken into account in the above description, the traveling time period between points can be placed on a trip time period similarly to the staying time period at a guidance-time-not-specified route point described above. However, in the case of shortening the staying time at route points, only the staying time at route points is shortened because the traveling time between points is obtained in advance by calculation or the like and cannot be shortened.

Description will be made, for example, on the case where, when the guidance time for a route point A is 13:00, the possible staying time at the route point A is 2 hours, the guidance time for a route point B is 15:00, the possible staying time at the route point B is 2 hours, the possible staying time at a route point C is 1.5 hours, and the possible staying time at a route point D is 1 hour, the passing pattern is: route point D->route point A->route->point B->route point C, and the traveling time between a departure point and the route point D is 1 hour, the traveling time between the route point D and the route point A is 1.5 hours, the traveling time between the route point A and the route point B is 1 hour, the traveling time between the route point B and the route point C is 0.5 hours, and the traveling time between the route point C and a destination point is 0.5 hours. FIG. 13 is a diagram showing an example of calculation for a guidance schedule in the embodiment 1.

Figure 13A:
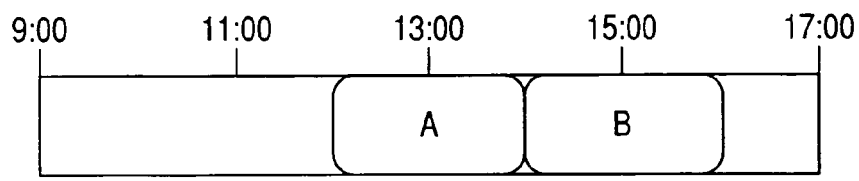
FIGS. 13A-13D are diagrams showing an example of calculation for a guidance schedule in the embodiment 1.

First, as shown in FIG. 13(A), the recommended route generating section 24 temporarily places the staying time periods at the route points A and B which are guidance-time-specified route points determined by the length corresponding to staying time with guidance time as the center thereof, on a trip time period. The recommended route generating section 24 determines that these staying time periods do not overlap with each other and proceeds to the next processing without performing processing for reducing the staying time at the route points A and B.

Figure 13B:
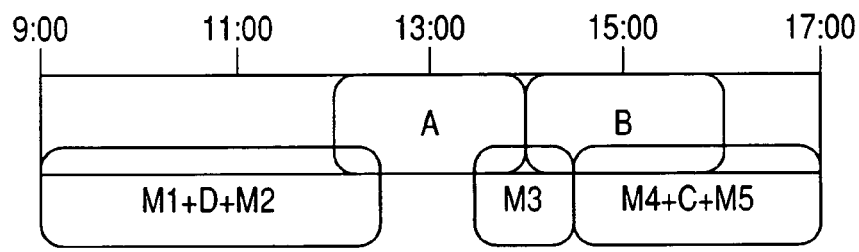

Next, as shown in FIG. 13(B), the recommended route generating section 24 temporarily places the staying time periods at the route point C and D which are guidance-time-not-specified route points, and the traveling time periods of movement among the points, on the trip time period. Hereinafter, the movement between the departure point and the route point D is denoted by M1, the movement between the route point D and the route point A is denoted by M2, the movement between the route point A and the route point B is denoted by M3, the movement between the route point B and the route point C is denoted by M4, and the movement between the route point C and the destination point is denoted by M5.

Here, the recommended route generating section 24 combines continuous traveling time periods and staying time periods at the guidance-time-not-specified route points into one time period and temporarily places it on the trip time period. In this example, the time periods M1, D and M2 are combined into one time period N1, and the time periods M4, C and M5 are combined into one time period N2.

The recommended route generating section 24 determines that the time period N1 and the staying time period NA at the route point A overlap with each other based on the departure time (=nine o'clock) and 3.5 hours, the length of the time period N1, determines that the staying time period NA and the traveling time period of M3 overlap with each other and that the time period NB at the route point B and the traveling time period of M3 overlap with each other based on the end time of the staying time period NA and the start time of the staying time period NB, and determines that the staying time period NB and the time period N2 overlap with each other based on the end time of the staying time period NB and the time of arrival at the destination point (=17:00).

The recommended route generating section 24 shortens the staying time at the route points A, B, C and D to three-fourths (less than 0.5 hours is to be rounded down, and the shortened staying time is to be an integral multiple of 0.5 hours). Thereby, the staying time at the route point A becomes 1.5 hours; the staying time at the route point B becomes 1.5 hours; the staying time at the route point C becomes 1 hour; and the staying time at the route point D becomes 1 hour.

Figure 13C:
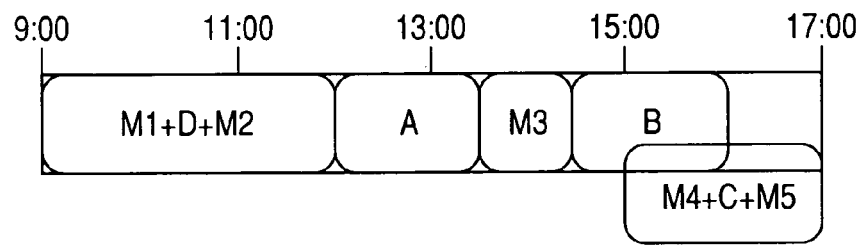

As shown in FIG. 13(C), the recommended route generating section 24 slides the staying time period NA at the route point A within such a range that the guidance time 13:00 is included in the staying time period NA at the route point A, and slides the staying time period NB at the route point B within such a range that the guidance time 15:00 is included in the staying time period NB at the route point B. Thereby, the time period N1 and the staying time period NA do not overlap with each other any more; the staying time period NA and the traveling time period of M3 do not overlap with each other any more; and the staying time period NB at the route point B and the traveling time period of M3 do not overlap with each other any more.

Figure 13D:
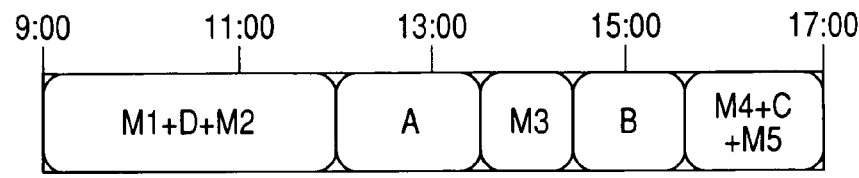

However, even in this state, it is determined that the staying time period NB and the time period N2 overlap with each other, based on the end time of the staying time period NB, the time of arrival at the destination point and the length of the time period N2. Therefore, as shown in FIG. 13(D), the recommended route generating section 24 shortens the staying time at the related route points B and C to three-fourths (less than 0.5 hours is to be rounded down, and the shortened staying time is to be an integral multiple of 0.5 hours). Thereby, the staying time at the route point B becomes 1 hour; the staying time at the route point C becomes 0.5 hours; and the staying time period NB and the time period N2 do not overlap with each other any more.

In this way, the recommended route generating section 24 determines staying time periods at route points as well as traveling time periods among points. The recommended route storing section 25 causes a guidance schedule including a passing pattern about these route points and each time period to be stored in the RAM 3 or the hard disk drive 4 together with data of a guidance route among the route points in that passing pattern.

A guidance route is generated by the processing described above. When the central processing unit 2 executes the route guiding program 12, a route guiding section is realized in the car navigation device 1.

The route guiding section periodically reads the values of the current latitude and longitude outputted from the GPS receiver 9. Then, the route guiding section reads image data of a predetermined area including the current position from the map data 18, based on the read values of the current latitude and longitude, and outputs image data in which a mark indicating the current position is superimposed on the image data of the predetermined area, to the liquid crystal monitor 5. The mark indicating the current position and a map around it are displayed on the liquid crystal monitor 5.

If there is a guidance route within the display area, the route guiding section superimposes the portion within the display area on the image data. Thereby, the guidance route is displayed together with the current position on the liquid crystal monitor 5, and the user can grasp the current position and the guidance route on the map.

When a vehicle moves, the values of the current latitude and longitude outputted from the GPS receiver 9 also change with the movement. The route guiding section switches the area to be read from the map data 18, based on the guidance schedule and the recommended route data described above so that the mark indicating the current position is continuously displayed on the liquid crystal monitor 5. The route guiding section causes the guidance route in the switched area to be displayed on the liquid crystal monitor 5.

Thus, the user leaves a departure point, passes each route point and reaches a destination point by driving the vehicle in a manner that the mark indicating the current position moves on the guidance route. In the example described above, the user can move from his or her home which is a departure point to a hotel which is a destination point via the route point D, the route point A, the route point B and the route point C in that order.

As described above, in the car navigation device 1 according to this embodiment 1, it is possible to generate such a guidance route that the maximum staying time at each route point is secured under departure/arrival conditions specified by a user, and guide the user along this guidance route. Accordingly, the user can stay at each of route points as long as possible and spend a day fully enjoying sightseeing and meals at the route points.

In this embodiment 1, possible staying time at each route point is set as the longest staying time at each route point in the table of conditions for route points according to categories 15, and if staying time periods at multiple route points or traveling time periods among the route points overlap with one another, the recommended route generating section 24 reduces the staying time at the route points. Additionally, for example, it is also possible that the shortest staying time at each route point is set in the table of conditions for route points according to categories 15, and the recommended route generating section 24 reduces the staying time at the route points in a manner that the staying time at each route point is not below this shortest staying time. Thereby, it is possible to prevent the staying time at each route point from being too short.

Still additionally, for example, it is also possible that only the shortest staying time at each route point is set in the table of conditions for route points according to categories 15, and the recommended route generating section 24 adds spare time left even after passing multiple route points, to the staying time at least at one route point. Thereby, it is possible to generate a guidance route for dropping into a lot of route points by simple processing.

Still additionally, for example, it is also possible that a flag about whether or not to require the staying time at route points to be fixed is set in the table of conditions for route points according to categories 15 or the like, and the recommended route generating section 24 adjusts only the staying time at route points with a flag indicating that fixation is not required.

In this embodiment 1, one guidance time is set for each route point in the table of conditions for route points according to categories 15. Additionally, for example, it is also possible that multiple guidance times can be set for each route point in the table of conditions for route points according to categories 15 or the like. Thereby, it is possible to give flexibility to the guidance time for a guidance-time-specified route point.

In this embodiment 1, when temporarily placing each route point on a trip time period, the recommended route generating section 24 places it so that a guidance time is to be right in the middle of possible staying time. Additionally, for example, the recommended route generating section 24 may set guidance time to be the staying start time of possible staying time so that staying is started at the guidance time. It is also possible that the time of departure from each route point is set instead of the guidance time in the table of conditions for route points according to categories 15 or the like, and the recommended route generating section 24 sets the departure time to be the staying end time of possible staying time so that a user leaves the route point at this departure time.

In this embodiment 1, one set of guidance time and possible staying time is set for each category in the table of conditions for route points according to categories 15. Additionally, for example, a set of guidance time and possible staying time may be set for each driver, for each crew constitution, for each season or for each age. One set may be set for each combination thereof. It is also possible to enable a user to update the guidance time and the possible staying time in the table of conditions for route points according to categories 15.

In this embodiment 1, the guidance time and the possible staying time for respective route points are those set for respective categories in the table of conditions for route points according to categories 15. Additionally, for example, it is also possible that the guidance time and the possible staying time may be set for each route point in the candidate route point search data 13 or the like. Thereby, it is possible to set the guidance time and the possible staying time not for each category but for each candidate route point individually. It is also possible that a user inputs the guidance time and the possible staying time for each route point.

EMBODIMENT 2

The hardware configuration and the content stored in a hard disk drive 4 of a car navigation device 1 according to an embodiment 2 of the present invention are the same as those of the car navigation device 1 according to the embodiment 1, though a part of a guidance route generating program 11 has been changed. Therefore, the same reference numerals as those in the embodiment 1 are used for the configuration, and description thereof will be omitted.

Next, description will be made on the operation of the car navigation device 1 according to the embodiment 2 having the above configuration.

When a central processing unit 2 executes the guidance route generating program 11, various functional blocks for generating a guidance route are realized in the car navigation device 1.

Figure 14:
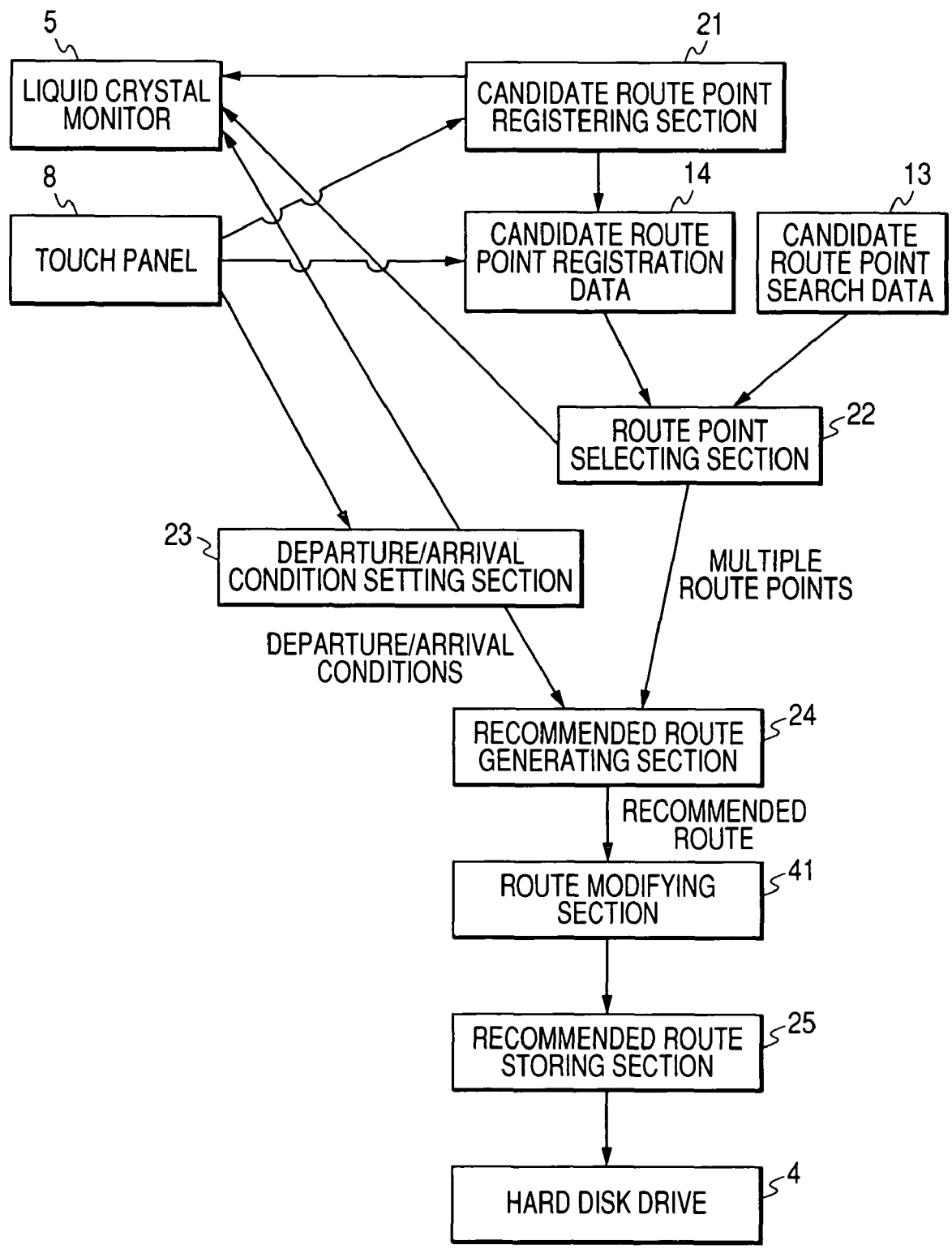
FIG. 14 is a block diagram showing functional blocks for guidance route generation realized in a car navigation device according to an embodiment 2 of the present invention.

FIG. 14 is a block diagram showing the functional blocks for guidance route generation realized in the car navigation device 1 according to the embodiment 2 of the present invention. By the central processing unit 2 executing the guidance route generating program 11, there are realized a candidate route point registering section 21, a route point selecting section 22, a departure/arrival condition setting section 23, a recommended route generating section 24, a route modifying section 41 and a recommended route storing section 25 are realized in the car navigation device 1.

The candidate route point registering section 21 updates candidate route point registration data 14. The route point selecting section 22 causes multiple candidate route points selected by a user to be stored in a RAM 3 or the hard disk drive 4 as multiple route points based on candidate route point search data 13 and the candidate route point registration data 14.

The departure/arrival condition setting section 23 causes a departure point, departure time, a destination point and arrival time inputted by the user to be stored in the RAM 3 or the hard disk drive 4 as departure/arrival conditions.

The recommended route generating section 24 searches for a recommend route leading from the departure point inputted by the user to the destination point inputted by the user via route points selected by the user.

The route modifying section 41 first causes a recommended route generated by the recommended route generating section 24 to be displayed on a liquid crystal monitor 5 as display means. Then, when the user operates a touch panel 8 in accordance with the screen of the liquid crystal monitor 5, the route modifying section 41 updates the recommended route generated by the recommended route generating section 24 to a route in accordance with the operation. The recommended route storing section 25 causes the recommended route updated by the route modifying section 41 and an actual guidance route among route points based on the recommended route to be displayed on the liquid crystal monitor 5 as display means and stored in the RAM 3 or the hard disk drive 4. The guidance operation by a route guiding section based on this recommended route is the same as the guidance operation of the route guiding section of the embodiment 1, and description thereof will be omitted.

Figure 15:
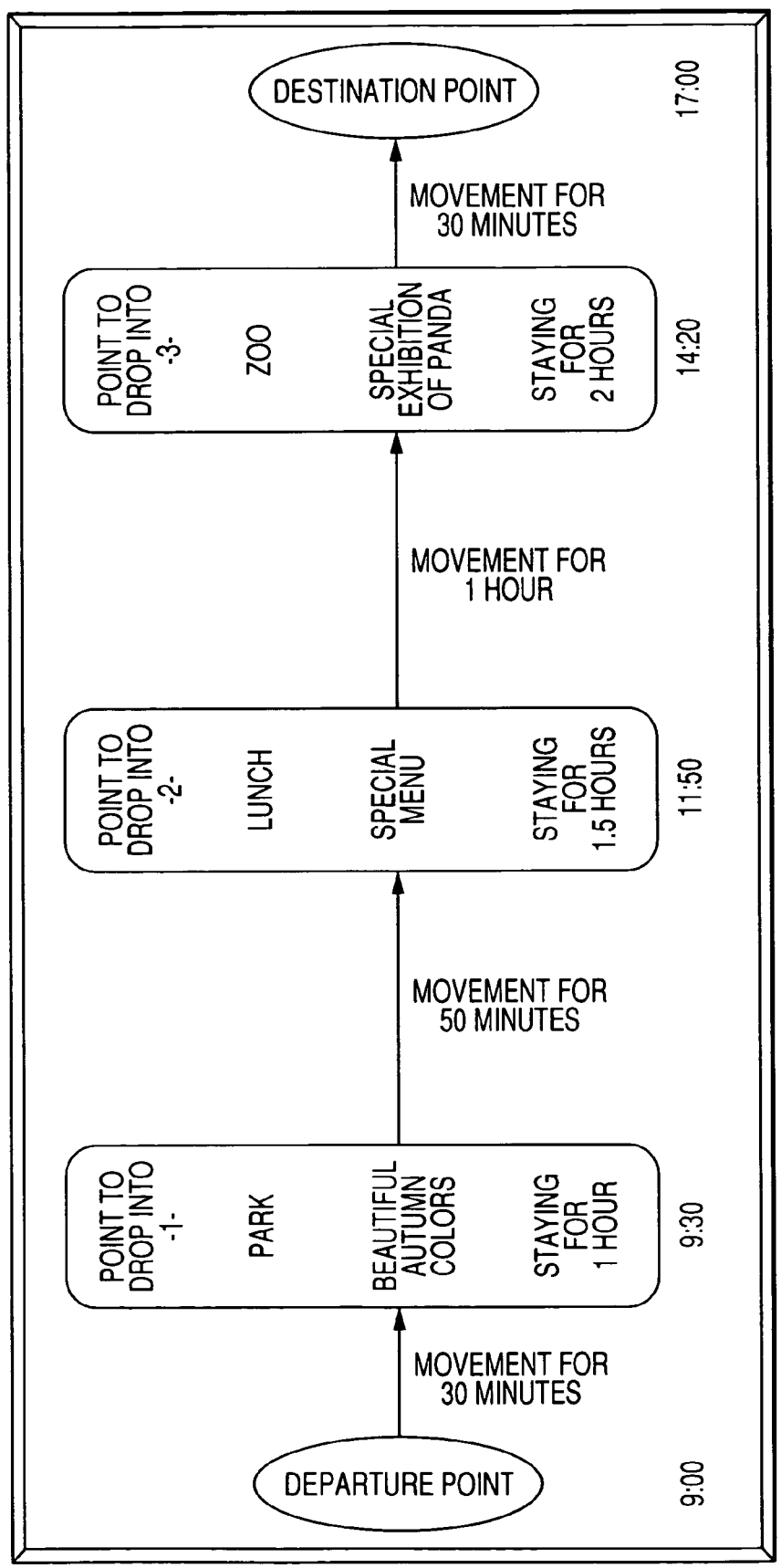
FIG. 15 is a screen illustration diagram showing an example of a display screen which displays a recommended route generated by a recommended route generating section.

FIG. 15 is a screen illustration diagram showing an example of a display screen which displays a recommended route (passing pattern) generated by the recommended route generating section 24. According to this recommended route generated by the recommended route generating section 24, after leaving a departure point at 9:00, a user stays at a park (first route point) for 1.5 hours from 9:30, eats lunch at a restaurant (second route point) for 1.5 hours from 11:50, stays at a zoo (third route point) for 2 hours from 14:20, and arrives at a destination point at 16:50.

If the user adds a coffee shop between the park (first route point) and the restaurant (second route point) as a new route point while such a recommendation is displayed on the liquid crystal monitor 5, then the route modifying section 41 generates a new recommended route in which the first route point is the park, the second route point is the coffee shop, the third route point is the restaurant, and the fourth route point is the zoo. The route modifying section 41 calculates the traveling time among the route points in this new recommended route and reviews the staying at each route point so that departure/arrival conditions inputted by the user are satisfied, to generate a new recommended route.

Figure 16:
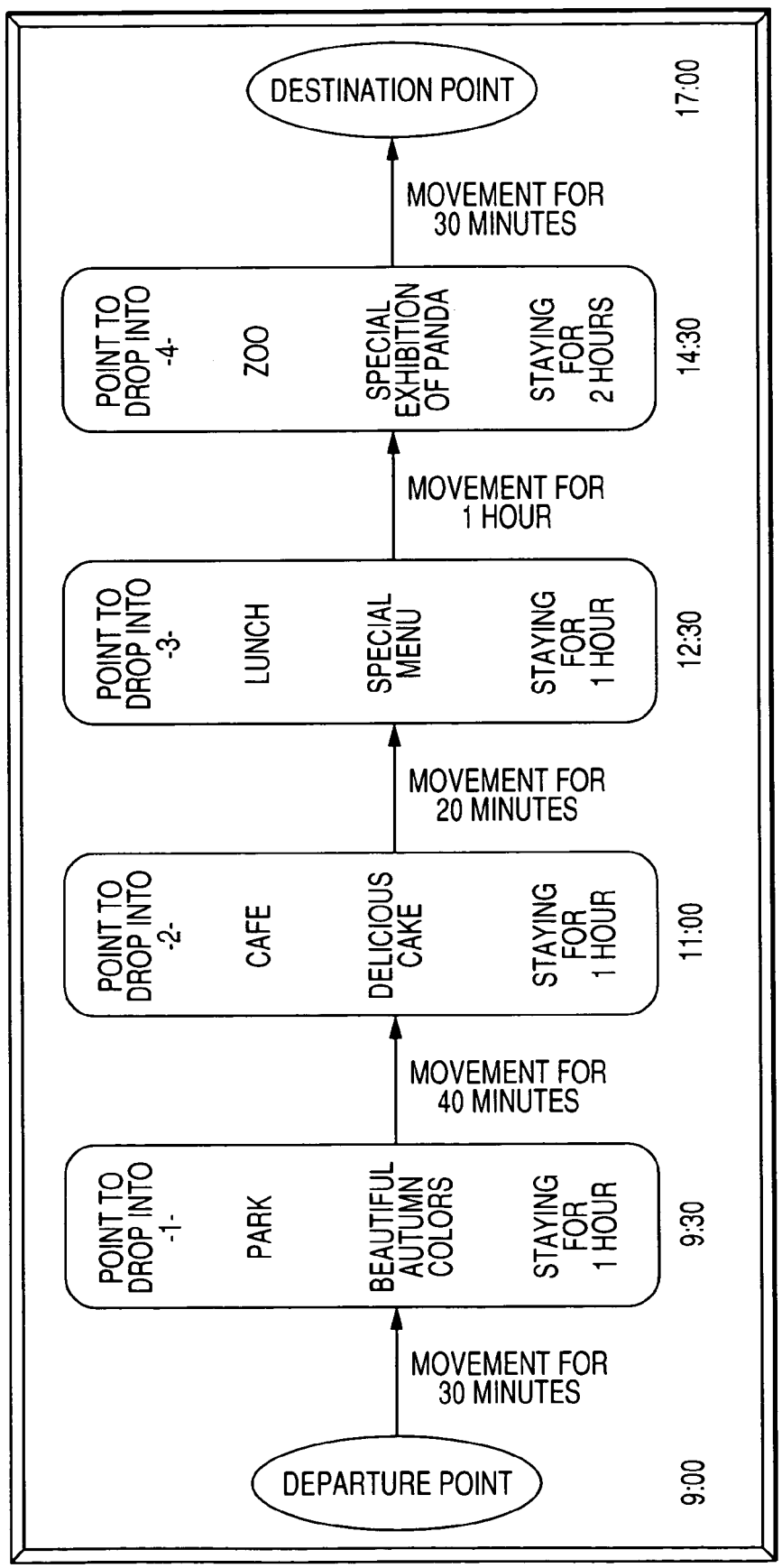
FIG. 16 is a screen illustration diagram showing an example of a display screen which displays a changed recommended route in the case where a coffee shop has been added as a route point to the recommended route shown in FIG. 15 generated by the recommended route generating section.

FIG. 16 is a screen illustration diagram showing an example of a display screen which displays a changed recommended route (passing pattern) in the case where the coffee shop has been added as a route point to the recommended route shown in FIG. 15 generated by the recommended route generating section 24. In the example in FIG. 16, by the coffee shop being added between the park and the restaurant, the staying time at the park is reduced from 1.5 hours to 1 hour, the staying time at the restaurant is reduced from 1.5 hours to 1 hour, and the time of arrival at the zoo is changed from 14:20 to 14:30.

If the user deletes the coffee shop from between the park (first route point) and the restaurant (second route point) while the recommended route shown in FIG. 16 is displayed on the liquid crystal monitor 5, then the route modifying section 41 generates a new recommended route in which the first route point the park, the second route point is the restaurant, and the third route point is the zoo. This route is the same as the recommended route illustrated in FIG. 15.

If the user changes the coffee shop, which is the second route point, to a waterfall while the recommended route shown in FIG. 16 is displayed on the liquid crystal monitor 5, then the route modifying section 41 generates a new recommended route in which the first route point is the park, the second route point is the waterfall, the third route point is the restaurant, and the fourth route point is the zoo.

Figure 17:
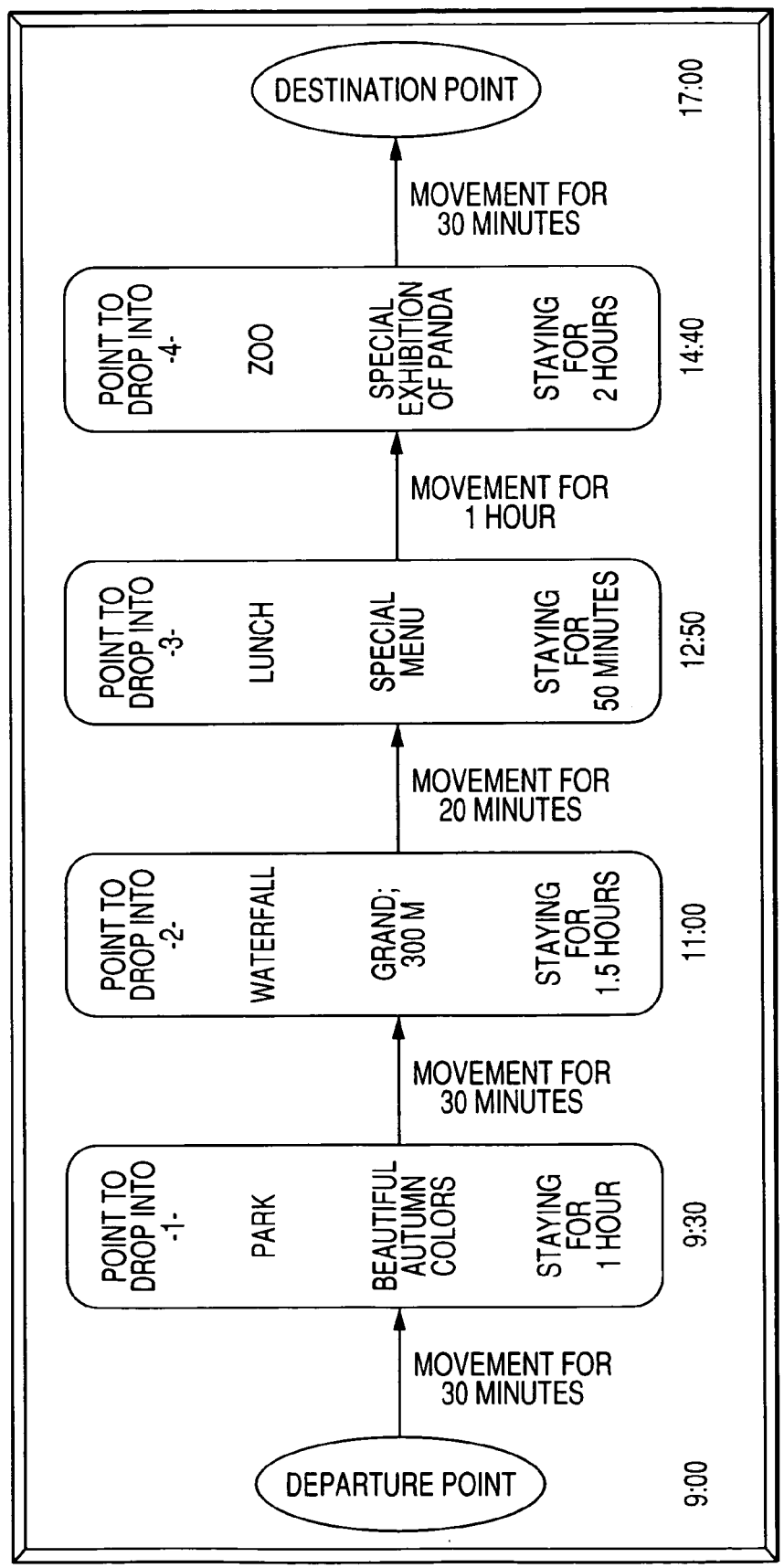
FIG. 17 is a screen illustration diagram showing an example of a display screen which displays a changed recommended route in the case where the coffee shop has been changed to a waterfall in the recommended route shown in FIG. 16.

FIG. 17 is a screen illustration diagram showing an example of a display screen which displays a changed recommended route (passing pattern) in the case where the coffee shop has been changed to the waterfall in the recommended route shown in FIG. 16. In the example in FIG. 17, by changing the coffee shop to the waterfall, the staying time at the restaurant is shortened from 1 hour to 50 minutes, and the time of arrival at the zoo is changed from 14:30 to 14:40.

As described above, in the car navigation device 1 according to this embodiment 2, it is possible to generate such a guidance route that the maximum staying time at each route point is secured under departure/arrival conditions specified by a user, and change the guidance route as appropriate.

Accordingly, the user is guided not simply along a guidance route retrieved by the car navigation device 1 but along a guidance route which he or she has customized and is satisfied with.

Each of the embodiments described above is an example of a preferable embodiment of the present invention. However, the present invention is not limited thereto, and various variations and modifications thereof are possible.

For example, in each of the embodiments described above, the guidance time may be set based on a typical value of business hours for a category such as shop. When the guidance time is set, the constraint condition may be provided that a user has to stay for at least a predetermined period of time after the guidance time.

In each of the embodiments described above, the guidance route search device for generating a guidance route is incorporated in the car navigation device 1 which performs guidance based on a guidance route generated by the guidance route search device. Additionally, for example, the guidance route search device may be realized by a computer device separate from the car navigation device. Furthermore, for example, the car navigation device and the computer device separate therefrom may be connected via a data communication network such as the Internet and a wireless communication network in a manner that data communication is possible. Furthermore, for example, the computer device separate from the car navigation device may be configured to receive information about multiple route points selected by the car navigation device via the data communication network and send a generated guidance route to the car navigation device.

In each of the embodiments described above, the car navigation device 1 is used as an example. Additionally, for example, the guidance route search device, the method of searching for guidance route and the navigation device according to the present invention can be applied to a portable information device such as a mobile phone terminal, a small-sized note computer device and a PDA (personal digital assistant) device. Furthermore, the guidance route search device and the method of searching for guidance route according to the present invention can be applied to an information device such as a desktop computer.

INDUSTRIAL APPLICABILITY

The guidance route search device, the navigation device and the method of searching for guidance route according to the present invention can be widely utilized, for example, for a car navigation device to be mounted on a vehicle such as a car, a pedestrian navigation device and other navigation devices.

The invention claimed is:

1. A guidance route search device, the device comprising:
    a route point specifying unit configured to specify multiple route points including multiple guidance-time-specified route points for which guidance times and staying time periods are specified and multiple guidance-time-not-specified route points for which the staying time periods are specified without specifying the guidance times, wherein the route points are passed through a route from a departure point which a user departs at a predetermined departure time to a destination point which the user reaches at a predetermined time of arrival;
    a first temporary determination unit configured to place only the guidance-time-specified route points of the route points in time periods from the departure time to the time of arrival based on the guidance times and the staying time periods, thereby temporarily determining a guidance schedule including only the guidance-time-specified route points;
    a first determination unit configured to determine whether or not the staying time periods at the guidance-time-specified route points overlap with one another in the guidance schedule which was temporarily determined by the first temporary determination unit;
    a first adjustment unit configured to eliminate the overlap among the staying time periods at the guidance-time-specified route points, thereby adjusting the staying time periods at the guidance-time-specified route points, if the first determination unit determined that the staying time periods at the guidance-time-specified route points overlap with one another;
    a second temporary determination unit configured to place the guidance-time-not-specified route points of the route points in the time periods from the departure time to the time of arrival, the time periods placing the guidance-time-specified route points which were adjusted by the first adjustment unit, thereby temporarily determining the guidance schedule including the guidance-time-specified route points and the guidance-time-not-specified route points;
    a second determination unit configured to determine whether or not the staying time periods at the guidance-time-specified route points and the staying time periods at the guidance-time-not-specified route points overlap with one another in the guidance schedule which was temporarily determined by the second temporary determination unit; and
    a second adjustment unit configured to eliminate the overlap among the staying time periods at the guidance-time-specified route points and the staying time periods at the guidance-time-not-specified route points, thereby adjusting the staying time periods at the guidance-time-specified route points and the staying time periods at the guidance-time-not-specified route points, if the second determination unit determined that the staying time periods at the guidance-time-specified route points and the staying time periods at the guidance-time-not-specified route points overlap with one another.

2. The guidance route search device according to claim 1, wherein the device further comprising:
    a selecting unit configured to generate multiple guidance schedules and select one of the guidance schedules.

3. The guidance route search device according to claim 1, wherein the first and second determination units consider traveling times among the guidance-time-specified route points and traveling times among the guidance-time-specified route points and the guidance-time-not-specified route points, thereby determining whether or not the staying time periods overlap with one another, and
    wherein the first and second adjustment units eliminate the overlap among the staying time periods based on the traveling times, thereby adjusting the staying time periods.

4. A guidance route search method to be performed by a central processing unit provided in a navigation device, the method comprising the steps of:

a route point specifying step for specifying multiple route points including multiple guidance-time-specified route points for which guidance times and staying time periods are specified and multiple guidance-time-not-specified route points for which the staying time periods are specified without specifying the guidance times, wherein the multiple route points are passed through a route from a departure point which a user departs at a predetermined departure time to a destination point which the user reaches at a predetermined time of arrival;

a first temporary determination step for placing only the guidance-time-specified route points of the route points in time periods from the departure time to the time of arrival based on the guidance times and the staying time periods, thereby temporarily determining a guidance schedule including only the guidance-time-specified route points;

a first determination step for determining whether or not the staying time periods at the guidance-time-specified route points overlap with one another in the guidance schedule which was temporarily determined by the first temporary determination step;

a first adjustment step for eliminating the overlap among the staying time periods at the guidance-time-specified route points, thereby adjusting the staying time periods at the guidance-time-specified route points, if the first determination step determined that the staying time periods at the guidance-time-specified route points overlap with one another;

a second temporary determination step for placing the guidance-time-not-specified route points of the route points in the time periods from the departure time to the time of arrival, the time periods placing the guidance-time-specified route points which were adjusted by the first adjustment step, thereby temporarily determining the guidance schedule including the guidance-time-specified route points and the guidance-time-not-specified route points;

a second determination step for determining whether or not the staying time periods at the guidance-time-specified route points and the staying time periods at the guidance-time-not-specified route points overlap with one another in the guidance schedule which was temporarily determined by the second temporary determination step; and a second adjustment step for eliminating the overlap among the staying time periods at the guidance-time-specified route points and the staying time periods at the guidance-time-not-specified route points, thereby adjusting the staying time periods at the guidance-time-specified route points and the staying time periods at the guidance-time-not-specified route points, if the second determination step determined that the staying time periods at the guidance-time-specified route points and the staying time periods at the guidance-time-not-specified route points overlap with one another.

5. The guidance route search method according to claim 4, wherein the method further comprising:
a selecting step for generating multiple guidance schedules and selecting one of the guidance schedules.

6. The guidance route search method according to claim 4, wherein the first and second determination steps consider traveling times among the guidance-time-specified route points and traveling times among the guidance-time-specified route points and the guidance-time-not-specified route points, thereby determining whether or not the staying time periods overlap with one another, and wherein the first and second adjustment steps eliminate the overlap among the staying time periods based on the traveling times, thereby adjusting the staying time periods.

7. A guidance route search program for causing a computer to execute the steps of:
a route point specifying step for specifying multiple route points including multiple guidance-time-specified route points for which guidance times and staying time periods are specified and multiple guidance-time-not-specified route points for which the staying time periods are specified without specifying the guidance times, wherein the multiple route points are passed through a route from a departure point which a user departs at a predetermined departure time to a destination point which the user reaches at a predetermined time of arrival;

a first temporary determination step for placing only the guidance-time-specified route points of the route points in time periods from the departure time to the time of arrival based on the guidance times and the staying time periods, thereby temporarily determining a guidance schedule including only the guidance-time-specified route points;

a first determination step for determining whether or not the staying time periods at the guidance-time-specified route points overlap with one another in the guidance schedule which was temporarily determined by the first temporary determination step;

a first adjustment step for eliminating the overlap among the staying time periods at the guidance-time-specified route points, thereby adjusting the staying time periods at the guidance-time-specified route points, if the first determination step determined that the staying time periods at the guidance-time-specified route points overlap with one another;

a second temporary determination step for placing the guidance-time-not-specified route points of the route points in the time periods from the departure time to the time of arrival, the time periods placing the guidance-time-specified route points which were adjusted by the first adjustment step, thereby temporarily determining the guidance schedule including the guidance-time-specified route points and the guidance-time-not-specified route points;

a second determination step for determining whether or not the staying time periods at the guidance-time-specified route points and the staying time periods at the guidance-time-not-specified route points overlap with one another in the guidance schedule which was temporarily determined by the second temporary determination step; and a second adjustment step for eliminating the overlap among the staying time periods at the guidance-time-specified route points and the staying time periods at the guidance-time-not-specified route points, thereby adjusting the staying time periods at the guidance-time-specified route points and the staying time periods at the guidance-time-not-specified route points, if the second determination step determined that the staying time periods at the guidance-time-specified route points and the staying time periods at the guidance-time-not-specified route points overlap with one another.

8. A navigation device, the device comprising:
a route guiding means for guiding a route based on the guidance schedule which was generated from the guidance route search device according to claim 1.

* * * * *